United States Patent [19]

Sekmakas et al.

[11] 4,151,131

[45] Apr. 24, 1979

[54] LOW TEMPERATURE CURING EPOXY ESTER COPOLYMERS

[75] Inventors: Kazys Sekmakas, Chicago; Raj Shah, Schaumburg, both of Ill.

[73] Assignee: DeSoto, Inc., Des Plaines, Ill.

[21] Appl. No.: 844,021

[22] Filed: Oct. 21, 1977

Related U.S. Application Data

[63] Continuation-in-part of Ser. No. 715,382, Aug. 18, 1976, abandoned, and Ser. No. 749,968, Dec. 13, 1976, abandoned.

[30] Foreign Application Priority Data

Aug. 12, 1977 [CA] Canada ................................... 284607

[51] Int. Cl.$^2$ .......................... C09D 3/52; C09D 3/56; C09D 3/58; C09D 5/02
[52] U.S. Cl. ........................... 260/19 EP; 260/19 UA; 260/21; 260/23 EP; 260/23 CP; 260/29.6 NR; 260/29.6 RW
[58] Field of Search .............. 260/21, 19 EP, 19 UA, 260/29.6 NR, 29.6 RW, 23 EP, 23 CP, 831, 833

[56] References Cited

U.S. PATENT DOCUMENTS

| | | | |
|---|---|---|---|
| 2,596,737 | 5/1952 | Tess et al. ......................... | 260/23 EP |
| 2,877,195 | 3/1959 | McNabb ........................... | 260/23 CP |
| 3,107,226 | 10/1963 | Tonner et al. .................... | 260/23 EP |
| 3,457,324 | 7/1969 | Sekmakas ......................... | 260/21 |
| 3,506,601 | 4/1970 | Sekmakas ........................ | 260/29.6 RW |
| 3,536,641 | 10/1970 | Sekmakas et al. ............. | 260/29.6 RW |
| 3,674,731 | 7/1972 | Guldenpfennig ................ | 260/23 CP |

*Primary Examiner*—Ronald W. Griffin
*Attorney, Agent, or Firm*—Dressler, Goldsmith, Clement, Gordon & Shore, Ltd.

[57] ABSTRACT

Low temperature curing aqueous coatings are provided in which the resin solids are constituted by an epoxy ester of a resinous polyepoxide with at least about 0.2 moles of monocarboxylic acid containing conjugated unsaturation and at least about 0.5 mole of monocarboxylic acid containing nonterminal nonconjugated unsaturation per equivalent in the polyepoxide. This epoxy ester is substantially free of epoxy groups and is copolymerized in solvent solution with monoethylenic monomers containing terminal unsaturation, including about 3% to about 20% carboxyl-functional monomers based on the weight of the copolymer to provide a nongelled, solvent-soluble copolymer possessing residual ethylenic unsaturation so that the copolymer can be dispersed in water with the aid of a base. These epoxy ester copolymers will dry and cure in air at room temperature. Also, and by including in the copolymer a proportion of monoethylenic monomer containing terminal unsaturation and providing a primary hydroxy group, the copolymer contains primary hydroxyl groups as well as carboxyl groups and residual unsaturation so that when aminoplast or phenoplast resin is incorporated in the water solutions, the applied coatings cure at remarkably low temperature to form solvent and corrosion-resistant coatings.

21 Claims, No Drawings

LOW TEMPERATURE CURING EPOXY ESTER COPOLYMERS

This application is a continuation-in-part of our prior application Ser. No. 715,382 filed Aug. 18, 1976 and Ser. No. 749,968 filed Dec. 13, 1976, both now abandoned.

The present invention relates to aqueous coating compositions based on epoxy ester copolymers which contain residual unsaturation to enable an oxidative cure. These coatings may be dried and cured in air at room temperature, or an aminoplast resin or a phenoplast resin can be added to provide aqueous coatings which cure at remarkably low temperature because part of the cure is an oxidative cure mechanism.

In accordance with this invention, a resinous polyepoxide, and preferably a bisphenol-based polyepoxide having a 1,2-epoxy equivalency of from about 1.4 to about 2.0, is reacted with two different ethylenically unsaturated monocarboxylic acids to substantially consume the epoxy functionality. One of the monocarboxylic acids contains conjugated ethylenic unsaturation, and the other monocarboxylic acid contains nonterminal nonconjugated ethylenic unsaturation. The polyepoxide can be reacted with the acids separately or with a mixture of the acids. The resulting unsaturated epoxy ester thus contains two different types of unsaturated side chains, and this epoxy ester is copolymerized in organic solvent solution, the solvent being preferably water miscible, with monoethylenically unsaturated monomer containing terminal ethylenic unsaturation and including a carboxyl-functional monomer. This forms a normally solid nongelled organic solvent soluble copolymer with the conjugated unsaturation in the epoxy ester while leaving the nonterminal nonconjugated unsaturation unconsumed in a copolymer containing carboxyl groups so as to be dispersible in water by at least partial neutralization with a volatile base to form an aqueous coating solution. This provides aqueous coatings which will dry and cure in air at room temperature. When a portion of the described monomers provides a primary hydroxyl group, and when aminoplast or phenoplast resin is dispersed in the coating composition, coatings which thermoset at very low temperature are provided.

The retained unsaturation in the copolymer has the capacity to combine with atmospheric oxygen so that a deposited coating will cure at room temperature. When the copolymer with its retained unsaturation includes monomer providing primary hydroxyl groups, the cure takes place both by reaction of methylol groups in the aminoplast or phenoplast resin with primary hydroxyl groups in the copolymer, as well as by an oxidative cure which is speeded by the moderate heat used for the aminoplast or phenoplast reaction.

The air drying, air curing, aqueous coatings are remarkable because even clear coatings air cure at room temperature in three days to pass 500 hours of 5% salt spray testing which is unusual where there is no bake and where no anticorrosive pigment is present to prevent corrosion.

The low temperature curing aqueous coatings are also remarkable because the aminoplast cure of hydroxy functional resins normally requires a curing temperature of from 325° F. to 400° F. to produce a good corrosion-resistant cure. In contrast, the cure in this invention only requires baking temperatures in the range of 240° F. to 290° F. While baking temperature will vary depending upon which aminoplast or phenoplast is used and the intended purpose of the product, this invention consistently lowers the temperature which is needed, normally by at least about 50° F.

It is also possible to replace the unsaturated monocarboxylic acids with corresponding monoalcohols and to proceed by etherification instead of by esterification. However, the unsaturated acids are more available and the esterification reaction proceeds more efficiently, so the unsaturated acids are preferred to the corresponding unsaturated alcohols.

The preferred starting materials are diepoxides or include diepoxides in admixture with monoepoxides. The epoxy ester of this invention are derivatives of the diepoxide component, and have the following formula:

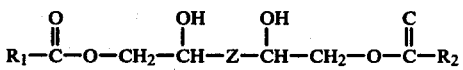

where $R_1$ is the residue of a fatty acid containing conjugated unsaturation, $R_2$ is the residue of a fatty acid containing nonterminal nonconjugated unsaturation, and Z is the residue of an organic diepoxide. The fatty acid would normally contain from 8–22 carbon atoms, preferably from 10–18 carbon atoms in the molecule. It will be understood that mixtures are formed which include the species shown by formula. Some or all of the hydroxy groups may also be esterified with the fatty acid, though this is not shown in the formula.

When the epoxy esters described above are copolymerized in water miscible organic solvent solution with monoethylenically unsaturated monomers having terminal unsaturation and which may include hydroxy-functional as well as carboxyl-functional monomers, a copolymer is formed in which much of the nonconjugated unsaturation in the epoxy ester is retained in a copolymer containing carboxyl groups and which may also contain primary hydroxyl groups. The acidic unsaturated resinous copolymers so-obtained are nongelled and organic solvent soluble, and can be dispersed in water with the aid of a base and water micible organic solvent.

The oxidative cure with atmospheric oxygen is assisted by the presence of driers, and driers, such as cobalt naphthenate, zirconium naphthenate, calcium naphthenate, or similar drier metal fatty acid salt, may be used and are helpful, but these are not needed. The driers would be used in an amount of about 0.3 to about 2%, based on the weight of the copolymer.

The preferred starting materials are resinous polyepoxides. Bisphenol-based diepoxides are particularly preferred. The average molecular weight of these can range from about 350 to about 4000 and the epoxy functionality is preferably in the range of 1.4–2.0, most preferably 1.8–2.0. Higher functional polyepoxides are also useful, but care must be taken to limit the proportion of conjugated unsaturation to avoid gelation during copolymerization. These molecular weights are obtained by calculating from the epoxide equivalent weights.

It is particularly preferred to employ a diglycidyl ether of bisphenol A having an average molecular weight of about 800 to about 3000, and a diglycidyl ether of bisphenol A having an epoxide equivalent weight of about 900 and an average molecular weight of about 1800 will be used as illustrative.

As previously indicated, the starting diepoxide is reacted with two different types of fatty acids. First, and to enable copolymerization with the terminal unsaturation in the monoethylenically unsaturated monomer, reliance is had upon a fatty acid including conjugated unsaturation. These fatty acids will be illustrated herein by conjugated 9-11 castor fatty acids which are a commercially available mixture of fatty acids which contain conjugated unsaturation at the 9 and 11 positions. Eleostearic acid, found in tung oil, and licanic acid, found in oiticica oil will further illustrate the conjugated fatty acids which are contemplated.

As will be appreciated, conjugated unsaturation is very reactive, and monoethylenic monomers containing the $CH_2=C<$ group (terminal unsaturation) will copolymerize in organic solvent solution with the conjugated unsaturation while leaving the bulk of any nonterminal nonconjugated unsaturation undisturbed.

It is desired that the copolymerization leave the epoxy ester in nongelled organic solvent-soluble condition, and this means that the number of conjugated groups per molecule must be limited to avoid cross-linking which causes premature gelation. For this reason, the conjugated fatty acid is used in an amount to provide from about 0.2 (preferably at least 0.5) to about 2.0 moles thereof per epoxy equivalent in the polyepoxide. Preferred proportions are from about 0.8 to about 1.5 mole of conjugated fatty acid per epoxy equivalent in the polyepoxide.

Substantially the entire balance of the epoxy functionality is consumed by reaction with the nonterminal nonconjugated unsaturated fatty acid. However, one can elect to waste a portion of the epoxy groups by esterification with a saturated fatty acid (lauric or myristic acids may be used) or by etherification with a saturated alcohol (lauryl alcohol is illustrative) and this can be done so long as there is employed at least about 0.5 mole (preferably at least about 0.8 mole) of nonterminal nonconjugated unsaturated fatty acid per epoxy equivalent in the polyepoxide to provide enough residual unsaturation in the final copolymer to enable a reasonable oxidative cure to take place.

Fatty acids containing nonterminal nonconjugated ethylenic unsaturation are well known and will be illustrated herein by tall oil fatty acids. Other useful acids are oleic acid, linoleic acid, linolenic acid, and erucic acid.

Typical proportions are illustrated by the use of a diepoxide reacted with two molar proportions of conjugated fatty acid and two molar proportions of nonterminal nonconjugated unsaturated fatty acid, with not more than 50% molar excess of either type of fatty acid over the other. All of the epoxy groups are esterified and preferably, at least some of the hydroxyl groups are esterified. The acid number of the epoxy ester product should be below 40, preferably below 20 to minimize the proportion of free fatty acid.

The reaction of the polyepoxide with the fatty acid is a conventional reaction which is assisted by the presence of a small amount of basic catalyst. The formation of epoxy esters and the production of soluble copolymers therefrom is shown in U.S. Pat. No. 2,877,195.

The monoethylenically unsaturated monomers will constitute from about 15% to about 150%, preferably from 50% to 90%, based on the weight of the epoxy ester. These monomers contain terminal unsaturation as previously indicated, and are desirably constituted by a mixture of carboxyl-functional monomer, optionally monomer having a primary hydroxyl group, and nonreactive monomer. As is common knowledge, a nonreactive monomer does not react under the contemplated conditions of polymerization and cure. This usually means that the single ethylenic group is the only functional group present. When air drying is intended, the proportion of monomers is preferably less than 100%, most preferably 25% to 70%, based on the weight of the epoxy ester.

The carboxyl-functional monomers must be selected for solubility and capacity for copolymerization. Suitable acids are acrylic acid, methacrylic acid, fumaric acid and maleic acid. The number of carboxyl groups is not important, but one, as in acrylic acid, is preferred. Enough acid should be used to enable dispersion in water after neutralization, and this requires from about 3% to about 20% of the carboxyl-functional monomers based on the weight of the copolymer. In preferred practice one would use from 5% to 12% of the carboxyl-functional monomers based on the weights of the copolymer.

The hydroxy-functional monomer is illustrated by hydroxy ethyl acrylate or methacrylate or allyl alcohol which provide primary hydroxy groups for cure with the aminoplast resin. From about 1% to about 15%, preferably from 2% to 8% of the weight of the copolymer should be constituted by the hydroxyl monomer. It should be noted that the epoxy ester itself possesses hydroxy groups, but these are secondary hydroxy groups which do not provide the low temperature cure desired herein.

The nonreactive monomers are best illustrated by styrene, but vinyl toluene may be used in its place. Less desirably, one can use methyl methacrylate, acrylonitrile, vinyl acetate, ethyl acrylate, butyl acrylate, or the like, alone or in admixture with one another. Styrene or vinyl toluene will preferably constitute the entirety of the nonreactive monomers since this provides a clear homogeneous copolymer which is hard to obtain when other nonreactive monomers are used.

The solution copolymerization is itself entirely conventional, the reaction taking place in the solvent medium using heat and a free radical polymerization catalyst, normally a blend of peroxides, such as ditertiary butyl peroxide and cumene hydroperoxide. The solution polymerization does not consume all of the unsaturation, and it is preferred to have a residual iodine value in the copolymer of at least about 40.

The solvents used should be minimized and selected for miscibility with water in the amounts used. Ether alcohols, such as 2-butoxy ethanol, exhibit good water miscibility, and ketones, such as methyl ethyl ketone, are also quite good. However, solvents with limited miscibility in water are also helpful, such as small amounts of butanol. The class of organic solvents which may be present when acidic resins are dispersed in water with the aid of a base is well known, and is not a feature of this invention, but alcoholic solvents are preferred.

The base used to neutralize the copolymer acidity is subject to wide variation, even sodium hydroxide being useful. Volatile nitrogenous bases are preferred, these being well known for the purposes of solubilizing acidic resins to provide aqueous coatings. Amines or ammonia are particularly useful, tertiary amines being best. This invention will be illustrated using dimethyl ethanol amine, but selection of the base is not a feature of this invention.

Neutralization of the copolymer acidity may be partial or complete as needed for dispersion in water. Complete (100%) neutralization is preferred herein, but normally 50–100% neutralization is adequate.

The initial solvent solution of neutralized resin is thinned with water until the water predominates. The final resin solids content can range from about 20% up, depending upon the coating thickness which is desired and the viscosity which can be tolerated for application. Flow coating constitutes a preferred application technique in this invention, but the invention is not so limited. Typical coatings are applied at 30–60% resin solids, but these can be pigmented or not as desired. Corrosion-resisting pigments, such as the conventional chromate pigments like strontium chromate and lead chromate may be used. For electrocoating, a resin solids content in the range of 2–20%, preferably 5–15% is employed.

When the coatings are dried and cured in air at room temperature, the oxidative cure with atmospheric oxygen gradually eliminates the solvent sensitivity of the film, and is complete in about 3 days. Regardless of whether cure is at room temperature or higher, driers, such as cobalt naphthenate, zirconium naphthenate, or calcium naphthenate, may be used in an amount of about 0.3 to about 2%, based on the weight of the copolymer.

The aminoplast and phenoplast resins which are useful herein may be of any character so long as they can be dissolved or stably dispersed in water containing the dissolved acidic copolymer. These resins provide methylol groups which are particularly reactive with the primary hydroxy groups and are used in an amount of from 5%–40%, preferably from 10%–35%, based on the total weight of resin. Typical aminoplast resins, all of which are formaldehyde condensates, are urea-formaldehyde, hexamethoxy methyl melamine and water dispersible transethers thereof with ethanol or other lower alcohol, benzoguanamineformaldehyde and the like, including acidic derivatives where the carboxyl groups assist solubilization in aqueous alkaline medium. Water soluble or dispersible phenolic resins(phenoplasts) are also useful, these being illustrated by the well known nongelled alkaline condensates of phenol with excess formaldehyde known as "A" stage resols. Any of these formaldehyde condensates can be used alone or in any desired mixture thereof. The phenolic resins provide the most outstanding corrosion and detergent resistance, but they introduce color problems which limit utility to primers which will be overcoated with opaque topcoats. The phenolic resins also require higher baking temperature than the aminoplast resins, but this invention still serves to reduce the temperature which is needed.

The invention is illustrated in the following examples. All parts herein are by weight unless otherwise stated.

EXAMPLE 1

Charge Composition (grams)

936 Diglycidyl ether of bisphenol A having an epoxide equivalent weight of 900
528 Conjugated 9–11 castor fatty acids
528 Tall oil fatty acids
  Set Dean-Stark trap with xylol. Heat to 150° C. to melt. Then add the following:
60 Xylol
3 Triethyl amine
  Heat to 220° C. and hold for an acid value of 20–23. Cool and add the following solvents:
480 2-butoxy ethanol
360 Butanol
  Premix the following monomers and catalysts and add over 3 hours at 120°–125° C. Hold for 1 hour.
600 Styrene
90 Acrylic acid
10 Ditertiary butyl peroxide
27 Cumene-hydro-peroxide
12 Cumene-hydro-peroxide—add and hold for 1 hour.
12 Cumene-hydro-peroxide—add and hold for 2 hours.
  Add the following solvents, and then cool.
50 2-Butoxy ethanol
50 Butanol
180 Methyl ethyl ketone The product is an organic solvent solution having a Gardner-Holdt viscosity of $Z_3$–$Z_4$, a Gardner color of 4, an acid value of 38.8, and a nonvolatile solids content of 67.9%. Upon addition of sufficient dimethyl ethanol amine to neutralize 100% of the acidity, the product is soluble in water.

The water solution at 40% solids was coated on a substrate, such as zinc phosphate steel panels, to provide a coating thickness of 1 mil. The deposited film dries in air about 1 hour to provide a handleable, tack-free, coating. The coating then cures in air in three days, to develop resistance to solvent attack and corrosion. The fully air cured films resist 5% salt spray for 500 hours and this is exceptional for a water applied, air cured unpigmented coating. Even a pigmented air dried coating would have difficulty passing this test, and we know of no product now commercially available which can pass this severe corrosion test in the absence of a bake.

EXAMPLE 2

Charge Composition (grams)

820 Diglycidyl ether of bisphenol A having an epoxide equivalent weight of 900
310 Conjugated 9–11 castor fatty acids
310 Tall oil fatty acids
  Set Dean-Stark trap with xylol. Heat 150° C. to melt. Then add the following:
60 Xylol
3 Triethyl amine
  Heat to 225° C. and hold for an acid value of 15–17. Cool to 125° C. and add the following solvent:
1200 2-Butoxy ethanol
  Premix the following monomers and catalysts and add over 3 hours at 120°–125° C.
900 Styrene
170 Acrylic acid
60 Hydroxy ethyl acrylate
15 Ditertiary butyl peroxide
45 Cumene-hydro-peroxide
20 Tertiary butyl mercaptan
350 2-Butoxy ethanol
  Hold for 1 hour at 120° C.
10 Cumene-hydro-peroxide—add and hold for 1 hour.
10 Cumene-hydro-peroxide—add and hold for 2 hours.
  Add the following solvent and then cool.
100 2-Butoxy ethanol The product is an organic solvent solution having a Gardner-Holdt viscosity of $Z_3$, a Gardner color of 3, and acid value of 55.4, and a novolatile solids content of 58.3%. Upon addition of sufficient dimethyl ethanol amine to neutralize 100% of the acidity, the product is soluble in water.

The water solution of this example has added thereto 25% by weight (based on total resin) of a liquid heat-hardening benzoguanamine-formaldehyde condensate (American Cyanamid product XM-1123* may be used) and acidity is neutralized 100% with dimethyl ethanol amine. The neutralized solution is then pigmented with titanium dioxide rutile to a pigment to binder ratio of 0.2:1 and deionized water is added to provide an aqueous solution having the desired total solids content. In this case, the solution at 40% total solids was flow coated on a substrate (zinc phosphate-treated steel panels) to provide a coating thickness of 0.5 mil. The deposited film was baked for 20 minutes at 250° F. to provide a cured coating which had a 4H pencil hardness and passed 60 inch pounds of reverse impact. It also exhibited good resistance to solvent attack and corrosion.

*Trademark

The same pigmented water solution diluted to 10% solids was electrodeposited at the anode at 110 volts to deposit a film having a thickness of 0.6 mil and this film was found to be curable at a temperature of about 50° F. below that usually needed. Thus, the cure was for 20 minutes at 375° F. instead of at 425° F.-450° F., as is normally needed for the same degree of cure. Despite the reduced curing temperature, the cured coating had a pencil hardness of 4H and almost passed 80 inch pounds of reverse impact. The higher baking temperature used for the electrocoated panels is based on the fact that greater corrosion resistance is insisted upon for this type of product.

We claim:

1. A low temperature curing aqueous coating comprising epoxy ester copolymer of an epoxy ester of a resinous polyepoxide having an epoxy functionality in the range of from 1.4 to about 2.0 with at least about 0.2 moles of ethylenically unsaturated monocarboxylic fatty acid containing conjugated ethylenic unsaturation per epoxy equivalent in the polyepoxide, and at least about 0.5 mole of ethylenically unsaturated monocarboxylic fatty acid containing nonterminal nonconjugated ethylenic unsaturation per epoxy equivalent in the polyepoxide, said epoxy ester being substantially free of epoxy functionality and being copolymerized in organic solvent solution with from about 15% to about 150%, based on the weight of the epoxy ester, of monoethylenically unsaturated monomers containing terminal ethylenic unsaturation to form a nongelled, solvent-soluble, copolymer possessing residual ethylenic unsaturation adapting the same for an oxidative cure, said monomers including from about 3% to about 20%, based on the weight of the copolymer, of carboxyl-functional monomers selected from acrylic acid, methacrylic acid, fumaric acid and maleic acid, said copolymer being dispersed in water with the aid of a volatile base and water miscible organic solvent, said water also having dispersed therein an aminoplast or phenoplast resin.

2. A low temperature curing aqueous coating as recited in claim 1 in which said carboxy-functional monomers are present in an amount of from 5% to 12% of the weight of the copolymer.

3. A low temperature curing aqueous coating as recited in claim 2 in which said polyepoxide is a diglycidyl ether of bisphenol A having an average molecular weight of about 800 to about 3000 and an epoxy functionality in the range of 1.8 to 2.0.

4. A low temperature curing aqueous coating as recited in claim 3 in which said epoxy ester contains from about 0.8 to about 1.5 moles of said conjugated fatty acid per epoxy equivalent in said polyepoxide.

5. A low temperature curing aqueous coating as recited in claim 1 in which said monocarboxylic fatty acids contain from 8-22 carbon atoms.

6. A low temperature curing aqueous coating as recited in claim 1 in which said polyepoxide is a bisphenol-based diepoxide having an average molecular weight of from about 350 to about 4000 and an epoxy functionality in the range of 1.8-2.0 and the nonreactive monomers are selected from styrene and vinyl toluene.

7. A low temperature curing aqueous coating as recited in claim 6 in which said epoxy ester contains less than 2.0 moles of said conjugated fatty acid per epoxy equivalent in said polyepoxide.

8. A low temperature curing aqueous coating as recited in claim 1 in which said monoethylenically unsaturated monomers are used in an amount of from 25% to 70%, based on the weight of the epoxy ester.

9. A low temperature curing aqueous coating as recited in claim 1 in which said copolymer has an iodine value of at least about 40.

10. A low temperature curing aqueous coating as recited in claim 1 in which said monomers further include monomer providing the primary hydroxy group in an amount of from about 1% to about 15% of the weight of the copolymer.

11. A low temperature curing aqueous coating as recited in claim 10 in which said carboxy-functional monomers are present in an amount of from 5% to 12% of the weight of the copolymer.

12. A low temperature curing aqueous coating as recited in claim 11 in which said monocarboxylic fatty acids contain from 10-18 carbon atoms.

13. A low temperature curing aqueous coating as recited in claim 11 in which said polyepoxide is a diglycidyl ether of bisphenol A having an average molecular weight of about 800 to about 3000 and an epoxy functionality in the range of 1.8 to 2.0, and the nonreactive monomers are selected from styrene or vinyl toluene.

14. A low temperature curing aqueous coating as recited in claim 13 in which from about 0.3 to about 2% of a drier is present, based on the weight of the copolymer, to speed the oxidative cure of said copolymer.

15. A low temperature curing aqueous coating as recited in claim 11 in which said epoxy ester contains from about 0.8 to about 1.5 moles of said conjugated fatty acid per epoxy equivalent in said polyepoxide.

16. A low temperature curing aqueous coating as recited in claim 11 in which said monoethylenically unsaturated monomers are used in an amount of from 50% to 90% based on the weight of the epoxy ester, and said hydroxy monomer is present in an amount of from 2% to 8% of the weight of the copolymer.

17. A low temperature curing aqueous coating as recited in claim 11 in which the acidity of said copolymer is provided by acrylic acid.

18. A low temperature curing aqueous coating as recited in claim 11 in which said copolymer has an iodine value of at least about 40.

19. A low temperature curing aqueous coating as recited in claim 11 in which said hydroxy monomer is hydroxy ethyl acrylate.

20. The low temperature curing aqueous coating of claim 11 in which said copolymer is neutralized with an amine and said aminoplast resin is benzoguanamine-formaldehyde.

21. The low temperature curing aqueous coating of claim 11 in which the proportion of aminoplast resin is from 5%-40%, based on total resin.

* * * * *